US009615373B2

(12) United States Patent
Wang et al.

(10) Patent No.: US 9,615,373 B2
(45) Date of Patent: *Apr. 4, 2017

(54) SELECTING A FREQUENCY BAND FROM A SET OF CANDIDATE FREQUENCY BANDS ASSOCIATED WITH A WIRELESS ACCESS POINT

(71) Applicant: AT&T Intellectual Property I, L.P., Atlanta, GA (US)

(72) Inventors: Feng Wang, Austin, TX (US); David R. Wolter, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/543,540

(22) Filed: Nov. 17, 2014

(65) Prior Publication Data

US 2015/0063290 A1    Mar. 5, 2015

Related U.S. Application Data

(63) Continuation of application No. 13/194,528, filed on Jul. 29, 2011, now Pat. No. 8,918,102.

(51) Int. Cl.
*H04W 72/00* (2009.01)
*H04W 16/30* (2009.01)
*H04W 72/08* (2009.01)
*H04W 72/04* (2009.01)
*H04L 5/00* (2006.01)
(Continued)

(52) U.S. Cl.
CPC .......... *H04W 72/085* (2013.01); *H04B 17/00* (2013.01); *H04L 5/006* (2013.01); *H04L 5/0044* (2013.01); *H04W 16/30* (2013.01); *H04W 72/00* (2013.01); *H04W 72/0453* (2013.01); *H04W 48/18* (2013.01)

(58) Field of Classification Search
CPC combination set(s) only.
See application file for complete search history.

(56) References Cited

U.S. PATENT DOCUMENTS 7,054,296 B1   5/2006   Sorrells et al.
7,573,857 B1   8/2009   Radhakrishnan et al.
(Continued)

OTHER PUBLICATIONS

"IEEE 802.11", from Wikipedia, the free encyclopedia, Retrieved from http://en.wikipedia.org/wiki/IEEE_802.11, Retrieved on May 25, 2011, 13 pages.
(Continued)

*Primary Examiner* — Cindy Trandai
(74) *Attorney, Agent, or Firm* — Toler Law Group, PC

(57) ABSTRACT

A method includes determining, at a wireless access point, a signal quality indicator associated with a user device in communication with the wireless access point. The method also includes determining, based on the signal quality indicator, a particular frequency band of a set of candidate frequency bands to use in a channel change operation, where each candidate frequency band of the set of candidate frequency bands supports a threshold power level that enables communication between the wireless access point and the user device. The method further includes selecting a particular channel from the particular frequency band to use in the channel change operation.

20 Claims, 6 Drawing Sheets

(51) Int. Cl.
*H04B 17/00* (2015.01)
*H04W 48/18* (2009.01)

(56) References Cited

U.S. PATENT DOCUMENTS

| | | | |
|---|---|---|---|
| 8,213,867 B2 | 7/2012 | Zhang et al. | |
| 2002/0099854 A1 | 7/2002 | Jorgensen | |
| 2003/0152046 A1* | 8/2003 | Kawai | H04W 72/02 370/328 |
| 2003/0182419 A1* | 9/2003 | Barr | H04W 36/06 709/224 |
| 2004/0034863 A1* | 2/2004 | Barrett | H04N 5/4401 725/38 |
| 2004/0034864 A1 | 2/2004 | Barrett et al. | |
| 2004/0037247 A1 | 2/2004 | Ngo | |
| 2004/0039817 A1 | 2/2004 | Lee et al. | |
| 2004/0101037 A1 | 5/2004 | Meng | |
| 2005/0213532 A1 | 9/2005 | Liu et al. | |
| 2005/0271009 A1 | 12/2005 | Shirakabe et al. | |
| 2006/0029023 A1 | 2/2006 | Cervello et al. | |
| 2007/0060057 A1 | 3/2007 | Matsuo et al. | |
| 2007/0076657 A1 | 4/2007 | Woodings et al. | |
| 2007/0104137 A1 | 5/2007 | Tang | |
| 2007/0105501 A1 | 5/2007 | Shen et al. | |
| 2007/0133478 A1 | 6/2007 | Armbruster et al. | |
| 2007/0191005 A1* | 8/2007 | Cooper | H04W 48/16 455/434 |
| 2008/0016190 A1 | 1/2008 | Halasz | |
| 2008/0025255 A1 | 1/2008 | Garg et al. | |
| 2008/0276105 A1* | 11/2008 | Hoberman | G06F 1/3203 713/300 |
| 2009/0010344 A1* | 1/2009 | Jalil | H04L 5/0007 375/260 |
| 2009/0016225 A1* | 1/2009 | Laroia | H04W 16/14 370/241 |
| 2009/0016261 A1* | 1/2009 | Laroia | H04W 16/14 370/328 |
| 2009/0016363 A1* | 1/2009 | Laroia | H04W 72/02 370/401 |
| 2009/0017838 A1* | 1/2009 | Laroia | H04W 48/18 455/456.1 |
| 2009/0023469 A1 | 1/2009 | Tomioka et al. | |
| 2009/0052403 A1 | 2/2009 | Hokao | |
| 2009/0054095 A1* | 2/2009 | Corke | H04W 72/02 455/509 |
| 2009/0061778 A1* | 3/2009 | Vrzic | H04W 16/02 455/62 |
| 2009/0149143 A1 | 6/2009 | Rokusek et al. | |
| 2010/0046455 A1 | 2/2010 | Wentink et al. | |
| 2010/0075704 A1 | 3/2010 | McHenry et al. | |
| 2010/0165913 A1 | 7/2010 | Ang et al. | |
| 2010/0177712 A1 | 7/2010 | Kneckt et al. | |
| 2010/0278166 A1 | 11/2010 | Seok et al. | |
| 2010/0303026 A1 | 12/2010 | Chaudhri et al. | |
| 2011/0134844 A1* | 6/2011 | Hosono | H04W 72/085 370/328 |
| 2011/0223877 A1* | 9/2011 | Tillman | H04W 16/14 455/226.2 |
| 2011/0317742 A1* | 12/2011 | Kawahatsu | H04L 1/0003 375/132 |

OTHER PUBLICATIONS

"IEEE 802.11a-1999", from Wikipedia, the free encyclopedia, Retrieved from http://en.wikipedia.org/wiki/IEEE_802.11a, Retrieved on May 25, 2011, 5 pages.

"IEEE 802.11ac", from Wikipedia, the free encyclopedia, Retrieved from http://en.wikipedia.org/wiki/IEEE_802.11ac, Retrieved on May 25, 2011, 3 pages.

"IEEE 802.11n-2009", from Wikipedia, the free encyclopedia, Retrieved from http://en.wikipedia.org/wiki/IEEE_802.11n, Retrieved on May 25, 2011, 11 pages.

"IEEE Standard for Information Technology—Telecommunications and Information Exchange Between Systems-Local and Metropolitan Area Networks—Specific Requirements", Part 11: Wireless LAN Medium Access Control (MAC) and Physical Layer (PHY) Specifications, Amendment 5: Enhancements for Higher Throughput, Oct. 29, 2009, 536 pages.

"Supplement to IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, High-speed Physical Layer in the 5 GHz Band, Jun. 12, 2003, 92 pages.

"U-NII", from Wikipedia, Retrieved from http://en.wikipedia.org/wiki/U-NII, Retrieved on May 25, 2011, 7 pages.

Stacy, et al., "IEEE P802.11-10/1361r3—Wireless LAN's—Proposed TGac Draft Amendment", Jan. 18, 2011, 154 pages.

* cited by examiner

SELECTING A FREQUENCY BAND FROM A SET OF CANDIDATE FREQUENCY BANDS ASSOCIATED WITH A WIRELESS ACCESS POINT

PRIORITY CLAIM

This application is a continuation of, and claims priority to, U.S. patent application Ser. No. 13/194,528, filed Jul. 29, 2011, which is hereby incorporated by reference in its entirety.

FIELD OF THE DISCLOSURE

The present disclosure is generally related to selecting a channel in a frequency band selected from a set of candidate frequency bands associated with a wireless access point.

BACKGROUND

Wireless networks are often used for communications. As the use of wireless networking increases, the chance that a wireless device using a wireless network will experience interference also increases. Typically, when a wireless device detects interference on an operating channel of a wireless network (e.g., due to a second wireless network operating on a same communication channel or on an adjacent channel, or any other interferences), the wireless device may switch operation or request a switch of operation to a different communication channel. Some wireless systems may include an automatic channel switching feature that enables the wireless device to automatically request a switch to a new communication channel. However, the new communication channel may not support transmission at as high a power level as the previous communication channel, which may cause the wireless device to lose connectivity.

DETAILED DESCRIPTION

Figure 1:
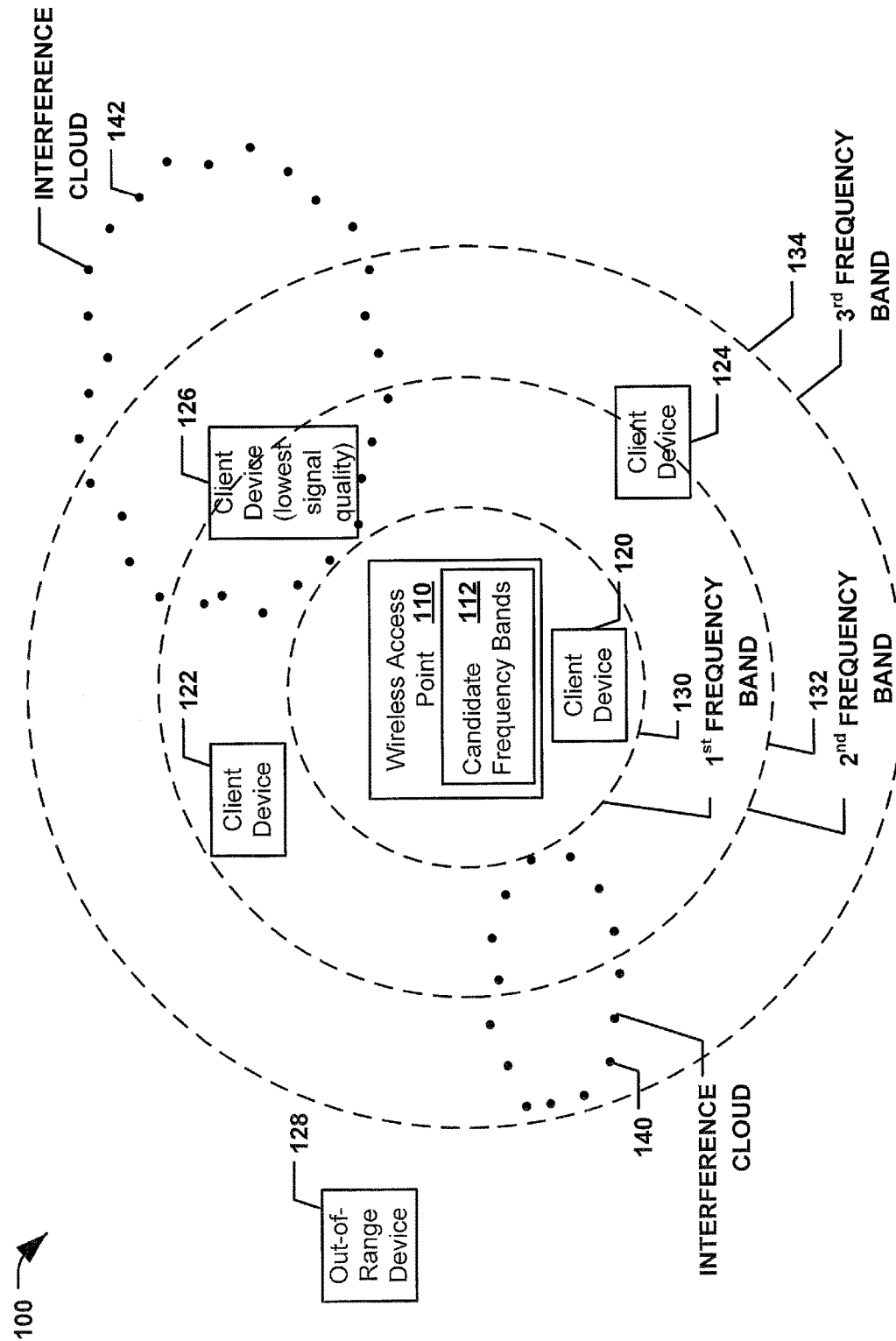
FIG. 1 is a diagram to illustrate a particular embodiment of a system to select a set of candidate frequency bands associated with a wireless access point.
Figure 2:
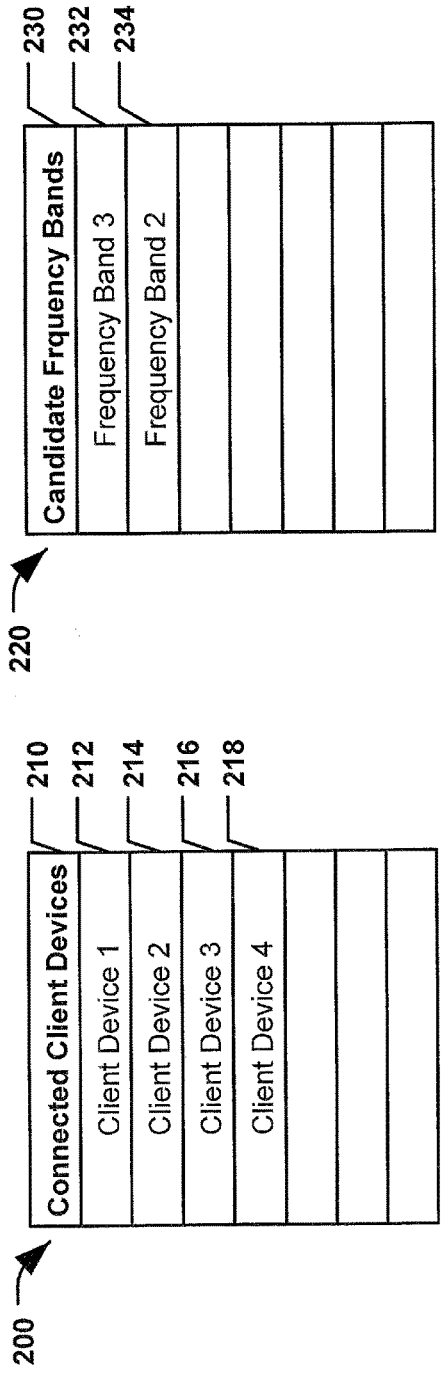
FIGS. 2A-2C illustrate particular embodiments of data structures used to identify client devices and to select a set of candidate frequency bands and channels associated with the wireless access point of FIG. 1.

Systems and methods of selecting a set of candidate frequency bands of differing output power are disclosed. Each frequency band may include a particular frequency or range of frequencies associated with a range of output power levels up to a maximum output power level. Further, each frequency band may include a particular frequency or a range of frequencies corresponding to one or more radio frequency (RF) channels. Each RF channel may be positioned at a particular frequency within a range of frequencies, and each RF channel included in a particular frequency band may have the same maximum output power level.

In response to an event (e.g., a power-on event), a wireless access point may select a channel corresponding to a frequency band having a highest allowed maximum output power (e.g., a frequency band that will provide the longest range) to communicate with wireless devices. A "weakest" wireless device may be identified, and a set of candidate frequency bands may be selected based on the identified "weakest" wireless device. To illustrate, the "weakest" wireless device may be a wireless device having a lowest signal quality as determined based on signals received from the wireless access point at each of the wireless devices, or based on signals received from each of the wireless devices at the access point. Each frequency band in the set of candidate frequency bands may correspond to one or more communication channels (e.g., multiple devices) and may satisfy a signal quality threshold associated with the "weakest" wireless device. The set of candidate frequency bands may represent those frequency bands (and communication channels associated therewith) that can be used in an automatic channel change process without losing connectivity with the "weakest" wireless device. Thus, to reduce the possibility of losing connectivity, channel selection may be accomplished based at least in part by selecting a frequency band that supports a particular power level. The set of candidate frequency bands may be updated periodically, in response to detecting a new device, in response to detecting that a particular device has moved out-of-range of the wireless access point, or in response to another event.

In a particular embodiment, a method includes identifying, at a wireless access point, a client device (e.g., a particular wireless device) in communication with the wireless access point based on a signal quality indicator associated with the client device. The wireless access point is operable to communicate with the client device by transmitting a signal over a channel within at least one of a plurality of frequency bands. The method further includes selecting a set of candidate frequency bands from the plurality of frequency bands, where the set of candidate frequency bands is associated with the identified client device. Each candidate frequency band in the set of candidate frequency bands supports a power level of the signal that satisfies a signal quality threshold associated with the client device.

In another particular embodiment, a wireless access point includes a processor and a memory. The memory stores instructions executable by the processor to identify a client device in communication with the wireless access point based on a signal quality indicator associated with the client device. The wireless access point is operable to communicate with the client device by transmitting a signal over a channel within at least one of a plurality of frequency bands. The memory also stores instructions executable by the processor to select a set of candidate frequency bands from the plurality of frequency bands, the set of candidate frequency bands associated with the client device. Each candidate frequency band in the set of candidate frequency bands supports a power signal level of the signal that satisfies a signal quality threshold associated with the client device.

In another particular embodiment, a non-transitory computer-readable storage medium includes instructions that, when executed by a processor, cause the processor to identify, at a wireless access point, a client device in communication with the wireless access point based on a signal quality indicator associated with the client device. The wireless access point is operable to communicate with the client device by transmitting a signal over a channel within at least one of a plurality of frequency bands. The computer-readable storage medium further includes instructions, that when executed by the processor, cause the processor to select a set of candidate frequency bands from the plurality of frequency bands, the set of candidate frequency bands associated with the client device. Each candidate frequency band in the set of candidate frequency bands supports a power level of the signal that satisfies a signal quality threshold associated with the client device.

FIG. 1 is a diagram to illustrate a particular embodiment of a system 100 to select a set of candidate frequency bands associated with a wireless access point 110. The wireless access point 110 may wirelessly communicate with a plurality of client devices. For example, as illustrated in FIG. 1, the wireless access point 110 may communicate wirelessly with a first client device 120, a second client device 122, a third client device 124, and a fourth client device 126. It should be noted that additional client devices may also be present, but may not communicate with the wireless access point 110 because they may be out of a range associated with the wireless access point 110 (e.g., as illustrated by out-of-range device 128). Generally, the system 100 is operable to select the set of the candidate frequency bands 112 (and channels therein) that may be used in a channel change procedure.

The wireless access point 110 may be a wireless gateway, a wireless router, a customer premise equipment (CPE) device, or another device operable to facilitate wireless communication with one or more client devices. The wireless access point 110 may include one or more processors and one or more memories as described herein with respect to FIG. 3. For example, the wireless access point 110 may include a memory storing instructions executable by the processor(s) to perform various wireless access point 110 functions including selecting the set of candidate frequency bands 112, as described herein.

As illustrated in FIG. 1, the wireless access point 110 may support wireless communication at each of a plurality of frequency bands of differing power levels. As an example, the plurality of frequency bands may include a first frequency band 130, a second frequency band 132, and a third frequency band 134. Each frequency band may include one or more wireless channels and may be associated with a corresponding maximum transmitter power and range of communication, as illustrated by dashed lines in FIG. 1. For example, a second range of communication associated with the second frequency band 132 may include a first range of communication associated with the first frequency band 130, and may include a more distant range of communication not supported by the first frequency band 130. Further, a third range of communication associated with the third frequency band 134 may overlap with the first range of the first frequency band 130 and the second range of the second frequency band 132. It should be noted that the number of frequency bands and the corresponding range of each frequency band, as illustrated in FIG. 1, are for exemplary purposes only. The wireless access point 110 may communicate via any number of frequency bands and each frequency band may have a different range. Generally, a particular frequency band may support transmission by the wireless access point 110 at a reduced power level when compared to a corresponding maximum power level of the particular frequency band. In a particular embodiment, frequency bands may have differing maximum transmission power levels but the same minimum transmission power level.

In a particular embodiment, the frequency bands 130-134 may be unlicensed national information infrastructure (UNII) sub-bands, such as UNII-1 (having a transmission power level of 50 milliwatts), UNII-2 (having a transmission power level of 250 milliwatts), and UNII-3 (having a transmission power level of 1 watt). Alternately, or in addition, the frequency bands may include a UNII worldwide sub-band (not shown) or even other frequency bands including a public safety band (e.g., 4.9 gigahertz), a 2.4 gigahertz industrial, scientific, and medical (ISM) band which may transmit at different power levels and may have different coverage range capabilities. In a particular embodiment, the wireless access point 110 and at least one of the client devices 120-126 may be compliant with an Institute of Electrical and Electronics Engineers (IEEE) 802.11b/g/a standard, an IEEE 802.11n standard, an IEEE 800.211ac standard, or any similar or replacement standard. In a particular embodiment, the wireless access point 110 and at least one of the client devices 120-126 may support communication frequencies of approximately 2.4 gigahertz, 3.6 gigahertz, 5 gigahertz, a different frequency, or any combination thereof.

The wireless access point 110 may generate the set of candidate frequency bands (and channels associated therewith) 112 based on signal quality associated with one or more of the client devices 120-126 for signals transmitted by the wireless access point 110, or for signals received at the wireless access point 110 from the client devices 120-126 of interest. The set of candidate frequency bands 112 may be used during a channel change procedure (e.g., in response to interference detected by the wireless access point 110 and/or by one or more of the client devices 120-126 that are in communication with the wireless access point 110, in response to detecting a low signal quality, in response to an automatic or user-initiated channel change request, etc.).

The client devices 120-126 may each be operable to communicate wirelessly with the wireless access point 110. For example, the client devices 120-126 may be a laptop computer (e.g., with a IEEE 802.11 wireless card), a set-top box (e.g. a wireless set-top box), a personal computer, a tablet computer, a personal digital assistant (PDA), a CPE device, a multimedia device, a game console, or a mobile phone. For example, one of the client devices 120-126 may be a wireless set-top box, and the wireless set-top box may be part of an Internet Protocol television (IPTV) system. The wireless access point 110 may be operable to receive a data stream via a distribution network and process the data stream to extract (e.g., isolate) voice data (e.g., to be provided to a voice over Internet Protocol (VoIP) device), video data (e.g., to be provided to the wireless set-top box), and network data (e.g., to be provided to Internet-enabled computing devices), or any combination thereof.

FIG. 1 also illustrates interference clouds 140 and 142. The interference clouds 140 and 142 represent interference that may be generated by another wireless access point (not shown), another wireless device (e.g., a wireless phone, a device operating in accordance with a IEEE 802.11 or 802.15 standard, or another wireless communication device), or any other interference source (e.g., a microwave oven, etc.), or a device or system operating within range of the wireless access point 110. In response to one or more of the interference clouds 140, 142, the wireless access point 110 may implement a channel change procedure for affected client devices or for all client devices.

During operation, the wireless access point 110 may initially establish communication with one or more of the client devices 120-126 at a particular wireless channel associated with a particular frequency band. For example, in a particular embodiment, upon powering up, the wireless access point 110 may establish communication with each of the client devices 120-126 at a highest power level of a channel included in a frequency band having a highest available output power level (e.g., the third frequency band 134 in FIG. 1). After communication has been established with each of the client devices 120-126, the wireless access point 110 may receive signal quality indicators (or may otherwise determine signal quality by the access point) for each of the client devices 120-126 in communication with the wireless access point 110. The wireless access point 110 may then identify a lowest signal quality client device (e.g., the client device 126 in FIG. 1). It should be noted that due to relative differences in antennae and transceiver circuitry, the client device 120-126 having the lowest signal quality may not necessarily be the client device 120-126 located furthest from the wireless access point 110. A set of candidate frequency bands 112 may then be determined with respect to the lowest signal quality client device (e.g., the client device 126 in FIG. 1).

For example, the client device 126 may be associated with a signal quality threshold which represents a minimum signal strength (e.g., power level) at which the client device 126 may operate. Based on the signal quality threshold (and corresponding power level), the wireless access point 110 may determine that certain frequency bands are candidates for channel changes while other frequency bands are not candidates for channel changes. For example, as illustrated in FIG. 1, channels corresponding to the second frequency band 132 and the third frequency band 134 will reach each of the client devices 120-126, but channels corresponding to the first frequency band 130 may not reach the client devices 122-126. Thus, the set of the candidate frequency bands 112 may be determined to include the second frequency band 132 and the third frequency band 134, but not those that are limited to the first frequency band 130. An illustrative example of identifying a "weakest" client device and selecting a set of candidate frequency bands that supports the "weakest" client device is further described with reference to FIGS. 2-6.

Channel change logic (not shown) at the wireless access point 110 may select a channel from one of the set of candidate frequency bands 112 in response to a channel change request that is automatically initiated by the wireless access point 110 or by one of the client devices 120-126, or that is manually initiated by a user. To illustrate, a channel change request may be initiated in response to detecting interference or detecting that a quality of service (QoS) parameter associated with the wireless access point 110 or one of the client devices 120-126 has exceeded a threshold. QoS parameters may include, but are not limited to, an error rate parameter and a packet loss parameter. In response to the channel change request, the wireless access point 110 may cease communication with the client devices 120-126 via a first channel and establish communication with the client devices 120-126 via a second channel, where the second channel is associated with one of the frequency bands in the set of candidate frequency bands 112.

The system 100 of FIG. 1 may thus enable the wireless access point 110 to determine the set of candidate frequency bands 112 prior to performing a channel change procedure. By selecting a new channel in accordance with the set of candidate frequency bands 112, the wireless access point 110 may perform the channel change procedure without risk (or with reduced risk) of causing a loss of connectivity at any of the client devices 120-126. In addition, by not considering channels corresponding to unavailable frequency bands (e.g., frequency bands not included in the set of candidate frequency bands 112), the system 100 of FIG. 1 may implement a faster channel change procedure.

FIGS. 2A-2C are illustrations of particular embodiments of data structures 200, 220, and 240 that may be used by the wireless access point 110 of FIG. 1 to identify client devices 120-126 of FIG. 1 and to select the set of candidate frequency bands 112 of FIG. 1.

FIG. 2A depicts a first data structure 200. In the first data structure 200, client devices in range of the wireless access point are listed as connected client devices 210. The connected client devices may be listed based on a device name, an assigned IP address, a time stamp, or other suitable designation. In FIG. 2A, connected client devices include a first client device 212, a second client device 214, a third client device 216, and a fourth client device 218. In a particular embodiment, each of the client devices 212-218 may correspond to one of the client devices 120-126 of FIG. 1 connected to the wireless access point 110 of FIG. 1. Since the out-of-range device 128 of FIG. 1 is not connected to the wireless access point 110 of FIG. 1, no corresponding entry is listed in the data structure 200. The list of client devices may be updated as client devices cease communication with the wireless access point and as additional client devices begin communication with the wireless access point.

The data structure 200 may be used to identify a client device associated with a low signal quality. To illustrate, a wireless access point may identify a "weakest" client device as compared to the client devices 212-218 listed in the data structure 200 by receiving signal quality indicators from each of the client devices 212-218 (or by otherwise determining or estimating signal quality for each of the client devices 212-218). In a particular embodiment, the fourth client device 218 (e.g., corresponding to the client device 126 of FIG. 1) is identified as the "weakest" client device associated with the lowest signal quality.

FIGS. 2B and 2C show alternative embodiments of data structures 220 and 240 that may identify a set of candidate frequency bands (e.g., the set of candidate frequency bands 112). Each candidate frequency band indicated in one of the data structures 220 and 240 is identified as an "available" frequency band by virtue of including (e.g., supporting) a power level that satisfies a signal quality threshold associated with the "weakest" client device of FIG. 2A.

The data structure 220 of FIG. 2B illustrates a particular embodiment of representing a set of candidate frequency bands with differing output power levels 230 without identification of channels associated with each frequency band of the set of candidate frequency bands 230. For example, as illustrated in FIG. 2B, the set of candidate frequency bands with different power levels 230 may include a third frequency band 232 and a second frequency band 234. To illustrate, as described with reference to FIG. 1, the wireless access point 110 may identify the client device with a lowest signal quality and may determine a minimum power level at which the identified client device is able to receive a signal that satisfies a signal quality threshold. Thus, each frequency band 232 and 234 listed in the data structure 220 may include (e.g., support) a power level that satisfies the signal quality threshold (e.g., the signal quality threshold of the "weakest" client device 126 of FIG. 1). For example, the third frequency band 232 may correspond to the third frequency band 134 of FIG. 1 and the second frequency band 234 may correspond to the second frequency band 132 of FIG. 1. In another example, the set of candidate frequency bands may be limited to a single frequency band, such as the third frequency band 232.

The data structure 240 of FIG. 2C illustrates a particular embodiment of representing a set of candidate frequency bands, associated frequency band availability, associated channels, and associated channel availabilities. The data structure 240 includes frequency bands 250, whether each of the frequency bands 250 is a candidate frequency band 252, channels 254 within each of the frequency bands 250, and whether each of the channels 254 is available 256 (e.g., for a channel change procedure).

As depicted in FIG. 2C, the frequency bands 250 may include all frequency bands at which the wireless access point 110 may operate. For example, the frequency bands 250 may include a third frequency band 260, a second frequency band 262, and a first frequency band 264, corresponding to the frequency bands 134, 132, and 130 of FIG. 1, respectively. Further, as depicted in FIG. 2C, the third frequency band 260 and the second frequency band 262 are indicated as available, at 270 and 272, and the first frequency band 264 is indicated as unavailable, at 274. A determination of whether a particular frequency band is available or unavailable may result from identification of a client device having a lowest quality signal and determining a lowest power level at which the wireless access point 110 may operate to communicate with the client device having the lowest signal quality.

Referring to FIG. 2C, the third frequency band 260 may be associated with a first channel 281 and a second channel 282. The second frequency band 262 may be associated with a third channel 283 and a fourth channel 284. The first frequency band 264 may be associated with a fifth channel 285, a sixth channel 286, and a seventh channel 287. It should be noted that a number of channels associated with each frequency band may vary and is not limited to the particular example of FIG. 2C.

In a particular embodiment, a method of determining whether a channel is available may be used to determine whether a particular channel 281-287 is available or unavailable, as indicated at 256. Moreover, the method may only be applied to channels that are associated with available frequency bands. In a particular embodiment, the method may include determining whether or not a particular channel is experiencing interference. In FIG. 2C, as a result of the method, the channels 281, 283, and 284 are identified as available (as indicated at 291, 293, and 294), and the channel 282 is identified as unavailable, at 292. The channels 285-287 may automatically be identified as unavailable for a channel change operation, as indicated at 295-297, as a result of the first frequency band 264 being unavailable (at 274) (e.g., classified as not being a candidate frequency band). Thus, the method (and data structure 240) indicates that a channel change to the channels 281-284 may be performed, but a channel change to the channels 285-287 may not be performed. The wireless access point 110 of FIG. 1 may limit selection of a channel used in the channel change procedure to only those channels that are associated with available frequency bands and that are indicated as available (e.g., free from interference or experiencing relatively low interference), i.e., the channels 281, 283, and 284.

In a particular embodiment, the wireless access point 110 may maintain the data structure 240 and may update the data structure 240 during normal operation (e.g., in response to a detect event change). As described with reference to FIG. 1, the wireless access point 110 may identify the client device 126 as having the lowest signal quality. The wireless access point 110 may determine whether each frequency band 260, 262, and 264 of the list of frequency bands 250 is available or unavailable as a candidate frequency band 252 (i.e., based on the client device 126). For each frequency band that is determined to be unavailable, the wireless access point 110 may automatically set channels associated with the frequency band to unavailable. For each frequency band that is determined to be available, the wireless access point 110 may determine whether each channel associated with the frequency band is available or unavailable (e.g., based on a channel availability determination method, as described above). Thus, as seen in FIG. 2C, a first set of channels (e.g., channels 281-284) is associated with a set of candidate frequency bands, and a second set of channels (e.g., channels 285-287) is associated with a set of unavailable (i.e., not candidate) frequency bands.

One or more of the data structures 200, 220, and 240 may be stored in a memory of the wireless access point 110. The data structures 200, 220, and 240 may be used for candidate frequency band selection as described further herein. Channel availability may be determined for each channel in each frequency band prior to receiving a channel change request or in response to receiving a channel change request.

In a particular embodiment, when selecting a channel for use in a channel change operation, the wireless access point may prioritize certain channels. For example, channels from a highest candidate frequency band (associated with a highest maximum power level) may be prioritized, so that the wireless access point supports a largest transmission range at which a new device may be detected. Alternatively, channels from a lowest candidate frequency band (associated with a lowest maximum power level) may be prioritized, so that the wireless access point can support communication with client devices at a lowest possible power level, thereby conserving power resources and minimizing interference to other systems.

Figure 3:
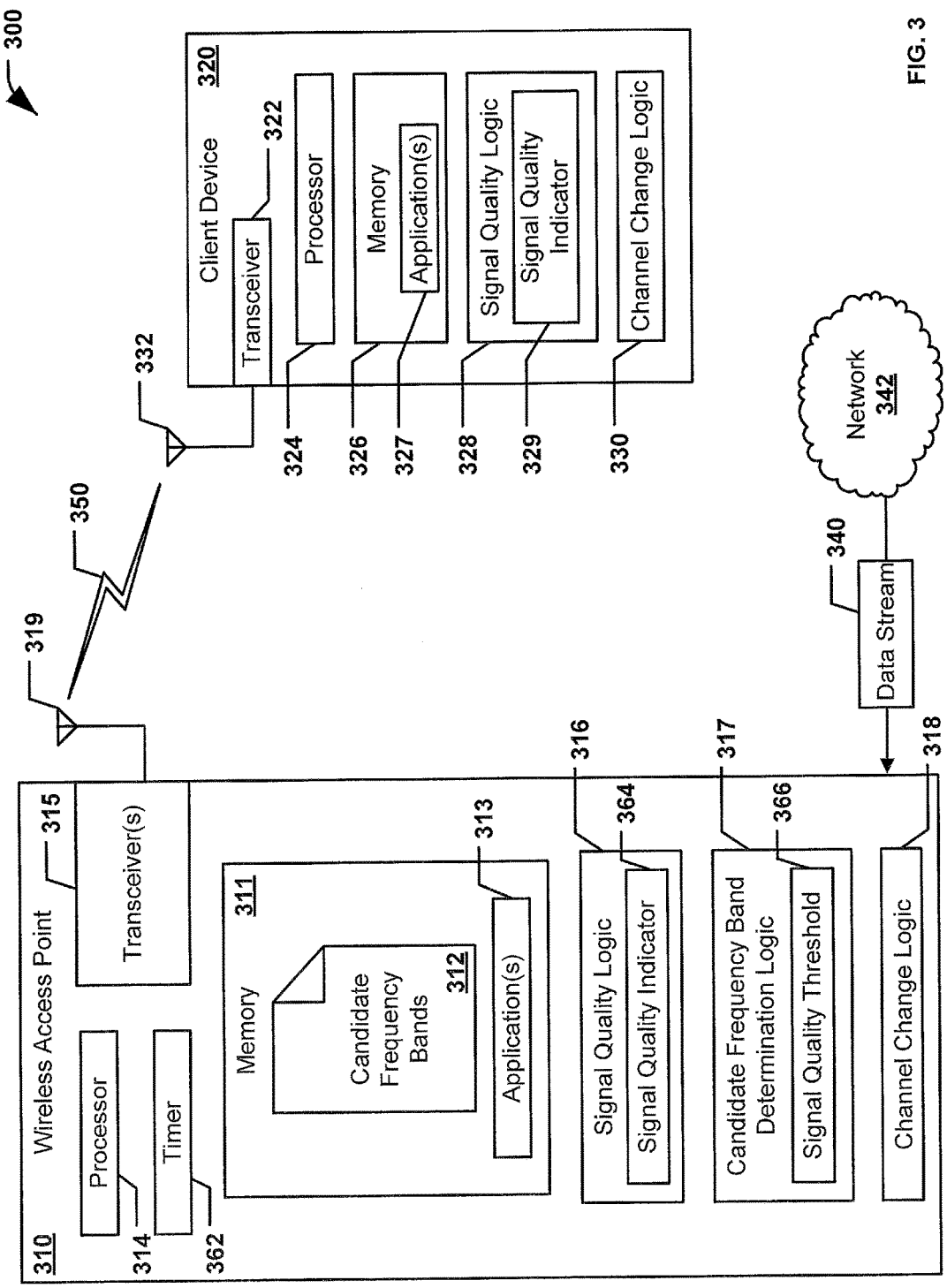
FIG. 3 is a diagram to illustrate another particular embodiment of a system that is configured to select a set of candidate frequency bands associated with a wireless access point.

FIG. 3 is a diagram to illustrate a particular embodiment of a system 300 to select a set of candidate frequency bands 312 associated with a wireless access point 310. The wireless access point 310 may be communicatively coupled to one or more client devices (e.g., including an illustrative client device 320). In an illustrative embodiment, the wireless access point 310 and the candidate frequency bands 312 may be the wireless access point 110 and the candidate frequency bands 112 of FIG. 1. In addition, the client device 320 may be one of the client devices 120-126 of FIG. 1. For example, the client device 320 may be the client device 126 of FIG. 1 having a lowest signal quality.

The wireless access point 310 may include a processor 314, a memory 311, signal quality logic 316, candidate frequency band determination logic 317, and channel change logic 318. The memory 311 may include the candidate frequency bands 312 and one or more application(s) 313. The wireless access point 310 may also include a timer 362 and a transceiver 315. The transceiver 315 may be coupled to an antenna 319. The transceiver 315 may be operable to transmit and receive data included in wireless communication 350 via the antenna 319. In a particular embodiment, a single transceiver may support multiple frequency bands corresponding to multiple transmission power levels. Alternately, the wireless access point 310 may include multiple transceivers with a separate transceiver for each supported frequency band.

The wireless access point 310 may be operable to receive a data stream 340 including data and may be operable to process the data stream 340 to extract the data. For example, when the wireless access point 310 receives the data stream 340 from a network 342 associated with a service provider (e.g., a triple-play communications provider), the wireless access point 310 may process the data stream 340 to extract voice data, video data, and network data.

During operation of the wireless access point 310, the processor 314 may execute the application(s) 313 stored in the memory 311. The application(s) 313 may include instructions that are executed by the processor 314. The processor 314 may also be operable to execute instructions associated with each of the signal quality logic 316, the candidate frequency band determination logic 317, and the channel change logic 318.

The signal quality logic 316, the candidate frequency band determination logic 317, and the channel change logic 318 may be utilized during the operation of the wireless access point 310 to communicate with the client device 320 and to produce the set of candidate frequency bands 312 based a signal quality indicator 364 (e.g., a signal quality corresponding to the "weakest" client device 320) and a signal quality threshold 366 (e.g., representing a minimum power level or minimum signal quality at which the client device 320 can communicate with the wireless access point 310). In a particular embodiment, the set of candidate frequency bands 312 may be updated periodically (e.g., in response to determining a time period has expired based on the timer 362). Examples of operation of the signal quality logic 316, the candidate frequency band determination logic 317, and the channel change logic 318 are further described with respect to FIGS. 4 and 5.

The client device 320 includes a transceiver 322, a processor 324, a memory 326, signal quality logic 328, and channel change request logic 330. The transceiver 322 is coupled to an antenna 332. The transceiver 322 may be operable to transmit and receive data included in wireless communication 350 via the antenna 332.

During operation at the client device 320, the processor 324 may execute the application(s) 327 stored in the memory 326. The application(s) 327 may include instructions that are executed by the processor 324. The processor 324 may also execute instructions associated with each of the signal quality logic 328 and the channel change logic 330. In a particular embodiment, the signal quality logic 328 is executable by the processor 324 to determine and transmit a signal quality indicator 329 to the wireless access point 310, where the signal quality indicator 329 may be stored as the signal quality indicator 364. For example, the signal quality logic 328 may determine a signal quality associated with a signal received by the client device 320 as part of the wireless communication 350 between the wireless access point 310 and the client device 320. In addition, the signal quality indicator 329 may be provided to the channel change request logic 330. In a particular embodiment, the signal quality indicators 329, 364 may be received signal strength indications (RSSIs). Signal quality indicators received from each client device connected to the wireless access point 310 may be evaluated to identify the lowest signal quality to identify the weakest client device (e.g., the client device 126 in FIG. 1).

The channel change request logic 330 may be operable to evaluate the signal quality indicator 329 to determine whether a channel change is to be requested. For example, the channel change logic 330 may compare the signal quality indicator 329 to a signal quality threshold. In a particular embodiment, additional or different quality metrics may be used, such as QoS parameters including packet loss or error rate. When the signal quality indicator 328 exceeds the signal quality threshold, the channel change logic 330 may generate a change channel indication and may transmit the change channel indication to the wireless access point 310 via the transceiver 322 and the antenna 332.

The system 300 of FIG. 3 may thus enable the wireless access point 310 to determine the set of candidate frequency bands 312, based on the "weakest" client device 320, prior to performing a channel change procedure. By selecting a new channel in accordance with the set of candidate frequency bands 312, the wireless access point 310 may perform the channel change procedure without risk (or with reduced risk) of causing a loss of connectivity at the client device 320.

Figure 4:
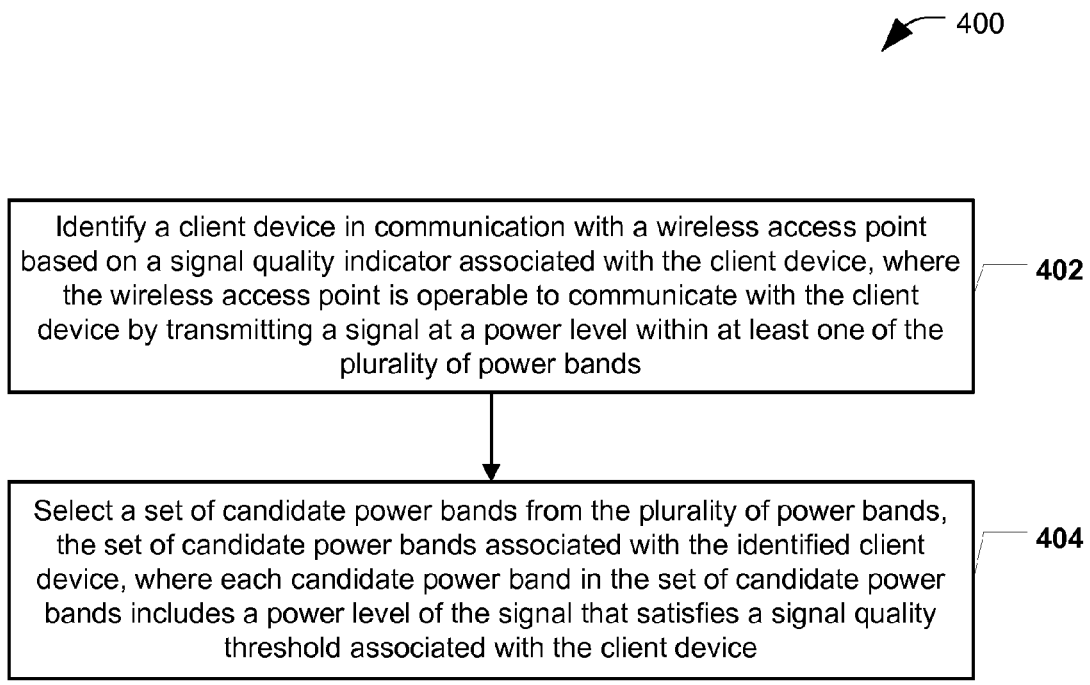
FIG. 4 is a flowchart to illustrate a particular embodiment of a method of selecting a set of candidate frequency bands associated with a wireless access point.

FIG. 4 is a flowchart to illustrate a particular embodiment of a method 400 of selecting a candidate set of frequency bands associated with a wireless access point. In an illustrative embodiment, the method 400 may be performed by the wireless access point 110 of FIG. 1 or by the wireless access point 310 of FIG. 3.

In a particular embodiment, the method 400 may include identifying a client device in communication with a wireless access point based on a signal quality indicator associated with the client device, at 402. The wireless access point may be operable to communicate with the client device by transmitting a signal at a power level of a channel within at least one of a plurality of frequency bands. For example, in FIG. 1, the wireless access point 110 may be in communication with the client devices 120-126 and may identify a particular client device (e.g., the client device 126) having a lowest signal quality. To illustrate, identification of the client device 126 may be performed based at least in part on one or more of the data structures 200, 220, and 240 of FIGS. 2A-2C. As another example, referring to FIG. 3, the wireless access point 310 may identify the client device 320 as having the lowest quality by use of the signal quality logic 316.

The method 400 includes selecting a set of candidate frequency bands from the plurality of frequency bands, at 404. In a particular embodiment, the set of candidate frequency bands is associated with the client device, where each candidate frequency band in the set of candidate frequency bands supports a power level of the signal that satisfies a signal quality threshold associated with the client device. For example, in FIG. 3, the candidate frequency band determination logic 317 may determine the set of candidate frequency bands 312 based on the signal quality indicator 364 received from the client device 320 and based on the signal quality threshold 366. The set of candidate frequency bands 312 may be stored in the memory 311 by use of one or more of the data structures 220 and 240 of FIGS. 2B and 2C.

The method 400 of FIG. 4 may thus enable a wireless access point to select a set of candidate frequency bands for use in a channel change procedure. By limiting selection of a new channel to the selected set of candidate frequency bands, the wireless access point may implement the channel change procedure without risk (or with reduced risk) of causing a loss of connectivity at client devices that are connected to the wireless access point.

Figure 5:
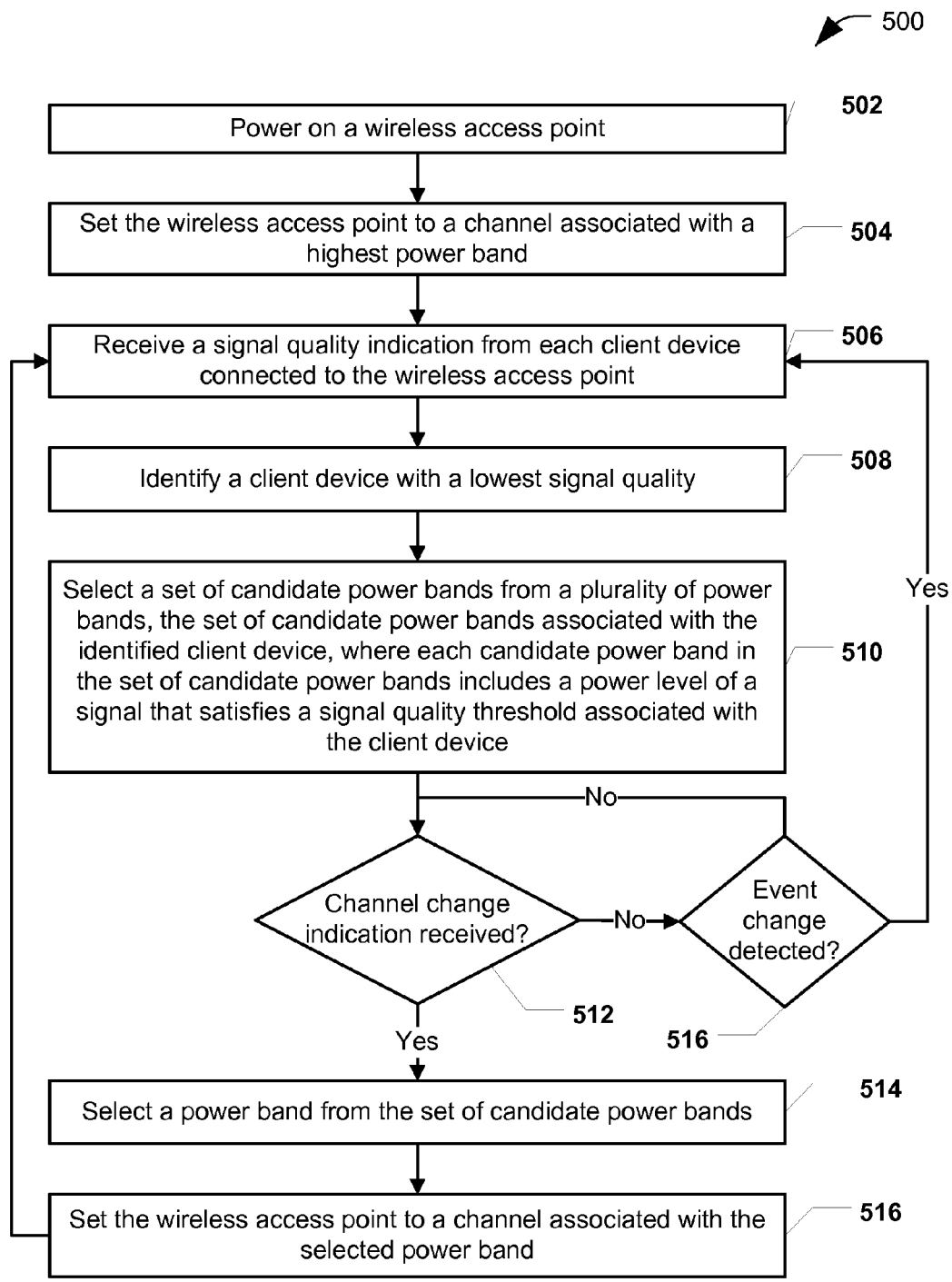
FIG. 5 is a flowchart to illustrate another particular embodiment of a method of selecting a set of candidate frequency bands associated with a wireless access point.

FIG. 5 is a flowchart to illustrate another particular embodiment of a method 500 to select a set of candidate frequency bands. In an illustrative embodiment, the method 500 may be performed by the wireless access point 110 of FIG. 1 or the wireless access point 310 of FIG. 3.

The method 500 may include detecting a power-up of a wireless access point, at 502. For example, in FIG. 3, the wireless access point 310 may detect a power-up event. The method 500 may also include setting the wireless access point to a channel associated with a frequency band having a highest maximum output power level, at 504. For example, in FIG. 3, the wireless access point 310 may be set to a channel associated with a frequency band having a highest maximum output power level. In this manner, the range of wireless coverage of the wireless access point 310 may be broadest (i.e., largest distance), thus allowing as many client devices as possible to connect to the wireless access point 310.

The method 500 may also include receiving a signal quality indicator from each client device connected to the wireless access point, at 506. For example, in FIG. 3, the wireless access point 310 may receive a signal quality indicator 329 from the signal quality logic 328 of the client device 320. The signal quality indicator 329 received at the wireless access point 310 may be forwarded to the signal quality logic 316 of the wireless access point 310.

The method 500 may include identifying a client device with a lowest signal quality, at 508. For example, in FIG. 3, the wireless access point 310 may identify the client device 320 as having the lowest signal quality based on the signal quality indicator 329 transmitted by the client device 320. In an illustrative embodiment, the client device 320 may be identified based at least in part of use of one or more of the data structures 200, 220, and 240 of FIGS. 2A-2C.

The method 500 may further include determining a minimum power level, at 510. For example, in FIG. 3, the candidate frequency band determination logic 317 may determine a minimum power level based on the signal quality indicator 364, where the minimum power level represents a lowest power level at which the client device 320 can communicate with the wireless access point 310. In an illustrative embodiment, the minimum power level may be identified based at least in part of use of one or more of the data structures 200, 220, and 240 of FIGS. 2A-2C.

The method 500 also includes selecting a set of candidate frequency bands from the plurality of frequency bands, where the set of candidate frequency bands is associated with the identified client device, at 512. In a particular embodiment, each candidate frequency band in the set of candidate frequency bands may support a power level of the signal that satisfies a signal quality threshold associated with the "weakest" client device. For example, in FIG. 3, the candidate determination logic 317 may determine the set of candidate frequency bands 312 based on the signal quality indicator 364 received from the client device 320 and based on the signal quality threshold 366. The set of candidate frequency bands 312 may be stored in the memory 311 by use of one or more of the data structures 220 and 240 of FIGS. 2B and 2C.

The method 500 may further include determining whether a channel change indication has been received, at 514. In response to a determination that the channel change indication has been received, the method 500 may advance to 516. In response to a determination that the channel change indication has not been received, the method 500 may advance to 520.

Moving to 516, the method 500 may include selecting a frequency band from the set of candidate frequency bands. For example, in FIG. 3, the set of candidate frequency band determination logic 317 may select a frequency band from the candidate frequency bands 312. The set of candidate frequency bands 312 may be stored by use of the data structures 220 of FIG. 2B or the data structure 240 of FIG. 2C. The candidate determination logic 317 may use a method to select the frequency band from the set of candidate frequency bands 312. For example, the candidate determination logic 317 may prioritize channels associated with frequency bands supporting a higher maximum power level or with frequency bands supporting a lower maximum power level, as described with reference to FIG. 2C.

The method 500 may further include setting the wireless access point to a channel associated with a candidate frequency band, at 518. In a particular embodiment, the choice of channels may further be limited to those channels that are associated with candidate frequency bands and that experience zero or relatively low interference. For example, in FIG. 3, the channel change logic 318 may set the wireless access point 310 to a channel associated with a candidate frequency band. In a particular embodiment, the channel change logic 318 may select a channel associated with a candidate frequency band selected from data structure 220 or 240 of FIG. 2B or 2C. The method 500 may then proceed to 506.

In response to a determination, that the channel change indication has not been received, at 514, the method 500 may advance to 520. Moving to 520, the method 500 may include determining whether an event change has been detected. For example, the event change may be a detection of a new client device, a determination that a client device is no longer in communication with the wireless access point, an expiration of a timer, a Wi-Fi protected set-up event, or any combination thereof. In response to a determination that an event change has not been detected, the method 500 may return to 514. In response to a determination that an event change has been detected, the method 500 may advance to 506 and update the set of candidate frequency bands. Thus, the set of candidate frequency bands may be updated in response to each detected event change.

The method 500 of FIG. 5 may thus enable a wireless access point to select a set of candidate frequency bands, based on a "weakest" client device, for use in a channel change procedure. In addition, by limiting selection of a new channel to channels in the selected set of candidate frequency bands, the method 500 of FIG. 5 may enable the wireless access point to perform the channel change procedure without risk (or with reduced risk) of causing a loss of connectivity at client devices that are connected to the wireless access point.

Figure 6:
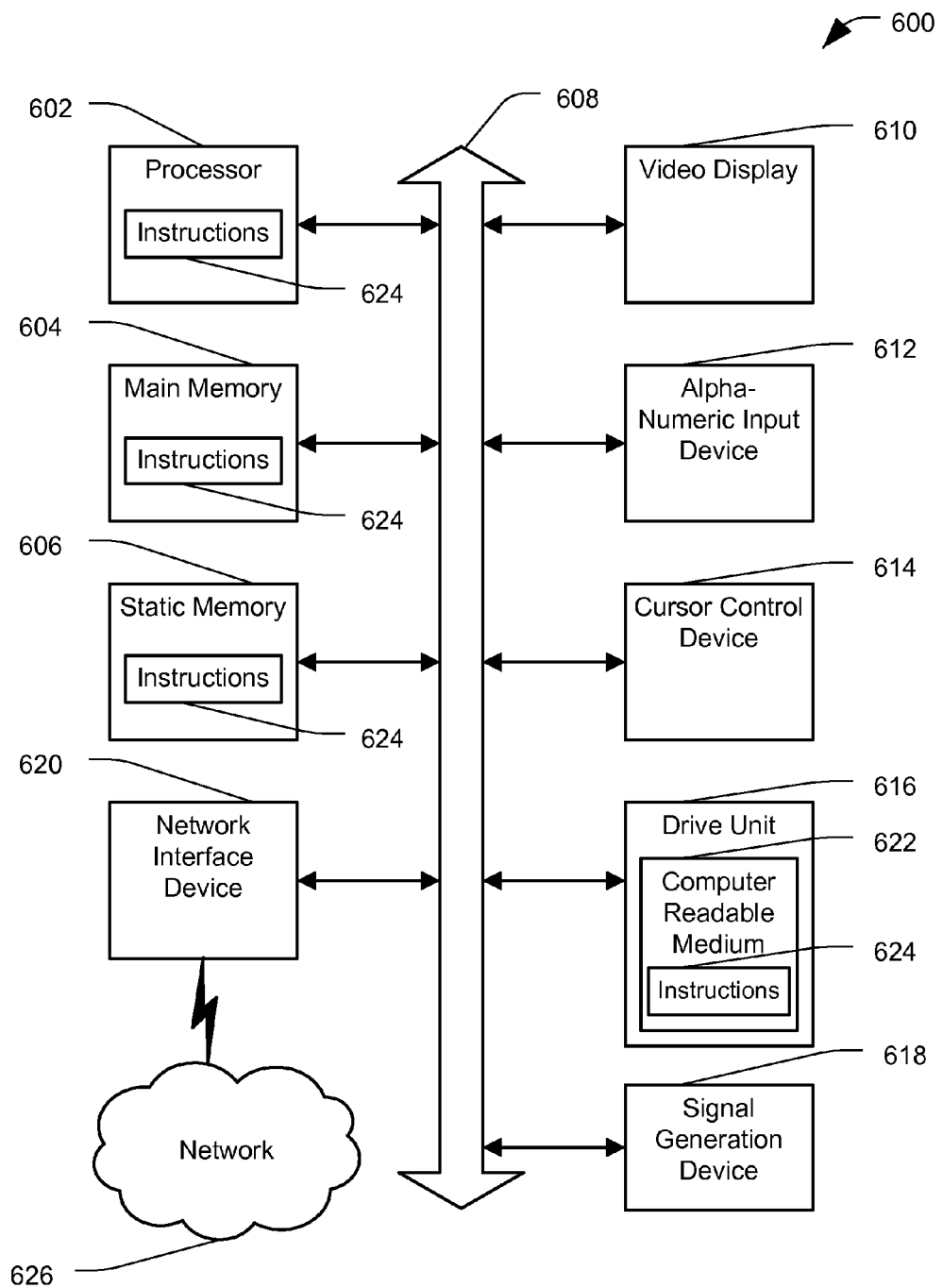
FIG. 6 is a block diagram of an illustrative embodiment of a general computer system operable to support embodiments of the systems and methods of FIGS. 1-5.

Referring to FIG. 6, an illustrative embodiment of a general computer system operable to select a set of candidate frequency bands associated with a wireless access point is shown and is designated 600. The computer system 600 includes a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. For example, the computer system 600 or components thereof may include, be included within, or may implement the wireless access point 110 of FIG. 1, the devices 120-128 of FIG. 1, the wireless access point 310 of FIG. 3, the client device 320 of FIG. 3, components thereof, or any combination thereof.

The computer system 600 can also be implemented as or incorporated into various other devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 600 can be implemented using electronic devices that provide audio, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. In an illustrative embodiment, one or more of the main memory 604 and the static memory 606 may store the data structures 200, 220, and 240 of FIGS. 2A-2C.

As shown, the computer system 600 may further include or be coupled to the video display unit 610, such as a liquid crystal display (LCD), an organic light emitting diode (OLED), a flat panel display, a cathode ray tube (CRT) display, a solid-state display, a projection display, a three dimensional display, or a combination thereof. Additionally, the computer system 600 may include an input device 612, such as a keyboard, a remote control device, and a cursor control device 614. The computer system 600 can also include a disk drive unit 616, a signal generation device 618, such as remote control device, and a network interface device 620. Depending on configuration, one or more components of the computer system 600 may not be included. For example, when the computer system 600 or components thereof are used to implement the wireless access point 110 of FIG. 1 or the wireless access point 310 of FIG. 3, one or more of the display unit 610, the input device 612, and the cursor control device 614 may not be included. Alternately, when the computer system 600 or components thereof are used to implement one or more of the client devices 120-126 of FIG. 1 or the client device 320 of FIG. 3, one or more of the display unit 610, the input device 612, and the cursor control device 614 may be included within the client device or may be coupled to the client device.

In a particular embodiment, as depicted in FIG. 6, the disk drive unit 616 may include a tangible (i.e., non-transitory) computer-readable medium 622 in which one or more sets of instructions 624, e.g., software, can be embedded. Further, the instructions 624 may embody one or more of the methods or logic as described herein. To illustrate, the instructions may embody the method 400 of FIG. 4, the method 500 of FIG. 5, the signal quality logic 316, 328 of FIG. 3, the candidate frequency band determination logic 317 of FIG. 3, the channel change logic 318, 330 of FIG. 3, the application(s) 313, 327 of FIG. 3, or any combination thereof. In a particular embodiment, the instructions 624 may reside completely, or at least partially, within the main memory 604, the static memory 606, and/or within the processor 602 during execution by the computer system 600. The main memory 604 and the processor 602 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by the computer system 600. Further, in an exemplary, non-limiting embodiment, implementations can include distributed processing, component/object distributed processing, and parallel processing. Alternatively, virtual computer system processing can be constructed to implement one or more of the methods or functionality as described herein.

The present disclosure contemplates a tangible computer-readable medium that includes instructions 624 or receives and executes instructions 624, so that a device connected to a network 626 can communicate audio, voice, video, or data over the network 626. Further, the instructions 624 may be transmitted or received over the network 626 via the network interface device 620. For example, the instructions 624 may be stored at a memory of the wireless access point 110 of FIG. 1 or the wireless access point 310 of FIG. 3 to enable communication of audio, voice, video, and/or data via the network 626.

The term "computer-readable medium" or "processor-readable medium" may include a single medium or multiple media, such as a centralized or distributed database, and/or associated caches and servers that store one or more sets of instructions. The term "computer-readable medium" or "processor-readable medium" may refer to any non-transitory, tangible medium that is capable of storing or encoding a set of instructions 624 for execution by the processor 602 or that cause the computer system 600 to perform any one or more of the methods or operations disclosed herein.

In a particular non-limiting, exemplary embodiment, the computer-readable medium can include a solid-state memory, such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

Software (e.g., the instructions 624) that implement the disclosed methods may be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission (e.g., TCP/IP, UDP/IP, HTML, HTTP, Internet Group Management Protocol (IGMP), Wi-Fi, IEEE 802.11, IEEE 802.15), systems operating within any RF spectrum bands (e.g. UNII, ISM, public safety band, etc.), and standards for encoding or viewing media content (e.g., MPEG, SMPTE, SVC, and H.264) represent examples of the state of the art. Such standards may occasionally be superseded by faster or more efficient equivalents having substantially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    determining, at a wireless access point, a signal quality indicator associated with a user device in communication with the wireless access point;
    after determining, based on the signal quality indicator, a threshold power level that enables communication between the wireless access point and the user device, determining a set of candidate frequency bands based on the threshold power level;
    selecting a particular frequency band of the set of candidate frequency bands for use in a channel change operation; and
    selecting a particular channel from the particular frequency band for use in the channel change operation.

2. The method of claim 1, wherein each candidate frequency band of the set of candidate frequency bands is associated with a corresponding maximum power, and wherein each candidate frequency band is determined to be included in the set of candidate frequency bands in response to the corresponding maximum power level satisfying the threshold power level.

3. The method of claim 2, further comprising selecting, prior to selecting the set of candidate frequency bands, a first channel associated with a highest available power to establish communication with a plurality of user devices, wherein the plurality of user devices includes the user device.

4. The method of claim 1, further comprising:
    determining, at the wireless access point, a second signal quality indicator associated with a second user device in communication with the wireless access point;
    in response to the signal quality indicator being greater than the second signal quality indicator:
        after determining, based on the second signal quality indicator, a second threshold power level that enables communication between the wireless access point and the second user device, determining a second set of candidate frequency bands based on the second threshold power level;
        selecting a second particular frequency band of the second set of candidate frequency bands for use in a second channel change operation;
        selecting a second particular channel from the second particular frequency band for use in the second channel change operation; and
        performing the second channel change operation by ceasing communication with the user device via the particular channel and establishing communication with the user device via the second particular channel.

5. The method of claim 1, further comprising storing, at a memory of the wireless access point, candidate data indicating the set of candidate frequency bands.

6. The method of claim 1, further comprising determining that the user device is associated with a lowest signal quality compared to corresponding signal qualities of other user devices of a plurality of user devices associated with the wireless access point.

7. The method of claim 6, further comprising identifying, at the wireless access point, the user device based on the signal quality indicator.

8. The method of claim 7, wherein the user device is identified in response to determining that the user device is associated with the lowest signal quality.

9. The method of claim 1, wherein the particular frequency band is associated with a particular maximum power, and wherein the particular maximum power is lower than a corresponding maximum power of any of the set of candidate frequency bands other than the particular frequency band.

10. The method of claim 1, wherein the wireless access point and the user device are each compliant with an Institute of Electrical and Electronics Engineers 802.11 standard.

11. The method of claim 1, wherein the user device comprises a laptop computer, a set-top box device, a personal computer, a tablet computer, a personal digital assistant, a customer premise equipment device, a multimedia device, a game console, a mobile phone, or any combination thereof.

12. A system comprising:
a processor; and
a memory storing instructions executable by the processor to cause the processor to perform operations including:
determining a signal quality indicator associated with a user device;
after determining, based on the signal quality indicator, a threshold power level that enables communication between the wireless access point and the user device, determining a set of candidate frequency bands based on the threshold power level;
selecting a particular frequency band of the set of candidate frequency bands for use in a channel change operation; and
selecting a particular channel from the particular frequency band for use in the channel change operation.

13. The system of claim 12, further comprising an antenna coupled to the processor, the antenna configured to receive a data stream via a network, wherein the operations further include:
processing the data stream to extract voice data, video data, network data, or any combination thereof; and
sending, to the user device via the antenna, extracted voice data, extracted video data, extracted network data, or any combination thereof.

14. The system of claim 12, wherein the operations further include performing the channel change operation by ceasing communication with the user device via a first channel and establishing communication with the user device via the particular channel.

15. The system of claim 14, wherein the operations further include storing, at the memory, candidate data indicating the set of candidate frequency bands, wherein the candidate data is stored prior to the channel change operation.

16. The system of claim 12, wherein the processor and the memory are components of a wireless access point, wherein the user device is in communication with the wireless access point.

17. A computer-readable storage device storing instructions that, when executed by a processor, cause the processor to perform operations including:
determining a signal quality indicator associated with a user device;
after determining, based on the signal quality indicator, a threshold power level that enables communication between the wireless access point and the user device, determining a set of candidate frequency bands based on the threshold power level;
determining a particular frequency band of the set of candidate frequency bands for use in a channel change operation; and
selecting a particular channel from the particular frequency band for use in the channel change operation.

18. The computer-readable storage device of claim 17, wherein the operations further include performing the channel change operation by ceasing communication with the user device via a first channel and establishing communication with the user device via the particular channel.

19. The computer-readable storage device of claim 17, wherein the operations further include selecting a first channel associated with a highest available power to establish communication with a plurality of user devices, wherein the plurality of user devices includes the user device.

20. The computer-readable storage device of claim 17, wherein the operations further include receiving the signal quality indicator from the user device.

* * * * *